Patented Oct. 21, 1924.

1,512,427

UNITED STATES PATENT OFFICE.

WALTER EDWIN TRENT, OF WASHINGTON, DISTRICT OF COLUMBIA.

FUEL-PRODUCING PROCESS AND PRODUCT.

No Drawing. Application filed February 9, 1924. Serial No. 691,831.

*To all whom it may concern:*

Be it known that I, WALTER E. TRENT, a citizen of the United States, residing at Washington, in the District of Columbia, have invented certain new and useful Improvements in Fuel-Producing Processes and Products, of which the following is a specification.

The invention relates to a process of manufacturing fuel and the product produced by such process.

It is an object of the invention to produce a fuel composed of finely pulverized coal and a binder, which is preferably of a substantially solid nature at atmospheric temperatures, so that the fuel mass is of a hard firm consistency yet containing a substantial part of the original volatile content of the coal.

The invention more specifically relates to improvements of the process disclosed in my Patent No. 1,420,164 granted June 20th, 1922 and is based on the discovery that, after coal has been purified or dehydrated by treating finely ground coal particles with an oil having fractions of substantially different boiling points resulting in purified agglomerated masses, these masses can be subjected to a low temperature distillation sufficient to remove the lower boiling point fractions or the low boiling fractions near the exterior surfaces so as to leave hard bonded fuel masses capable of the same use and handling as anthracite coal, briquettes or the like.

The invention further comprehends a process in which the finely pulverized coal, preferably in water suspension, may be treated with especially blended liquid hydrocarbon agent which consists of two substances, one a liquid and the other, before blending, substantially solid at atmospheric temperatures, to produce with the fine coal upon agitation semisolid or plastic fuel masses which masses are then subjected to a heat treatment to distill part, or all, of the liquid fraction of the agent without substantially disturbing the solid fraction of the agent which, upon cooling, returns to a solid state, thus bringing the coal particles into a hard solid mass.

I have discovered these bonded masses, which ordinarily have a spherical contour, burn practically without smoke under ordinary conditions of combustion, which I attribute to the facts that, first, the masses do not crack or separate in layers during the period that their volatile content is being distilled from the mass and, second, that the water content has been removed. Fuels having a water content are subject to cracking and exposing new surfaces to radiant heat which causes an undue generation of smoky vapors. Water content in fuels also reduces the temperature of combustible gases and thereby retards complete combustion and causes the emission of smoke. Coals containing a considerable amount of volatile matter are subject to rapid fracturing under temperatures existing in stoves and furnaces due to the fact that they are of a laminated or sedimentary structure. Water content in coal increases the fracturing.

In this process the laminated or sedimentary structure of the coal is completely destroyed by the fine grinding and the collection of these particles with the liquid hydrocarbon into semi-solid or plastic masses of completely uniform and homogeneous composition which, after a heat treatment for the removal of the water and part or all of the light oil, results in a fuel that retains its shape during combustion so long as gases are being emitted and, therefore, burns substantially smokeless.

It is frequently desirable to leave some of the light oil in the masses and at such times the heat treatment is limited to driving out only that part of the light oils that are near the surfaces of the masses and only to a sufficient depth to cause, upon cooling the masses, a hardened surface of just sufficient thickness to make the masses rugged and strong enough to stand ordinary handling. For fuel marbles about one inch in diameter this case hardening for about one-eighth depth is quite sufficient.

It is desirable at times to run the green fuel masses through different sorts of molding machines in order to form the masses into desirable shapes before applying heat treatment. The object of feeding the green fuel masses through molding machines is not for the purpose of making hard durable briquettes or boulettes as they contain too much liquid agglomerating agent to give such a result. This operation is merely for the purpose of forming the green fuel masses into desired shapes before the heat treatment to remove the water and the liquid oil of the hydrocarbon agent, which results in the hardening of the masses.

It is an essential part of this process, also, to condense the oil vapors distilled by the heat treatment and to reuse same as the liquid member of the hydrocarbon agent for the further production of the green purified fuel masses.

In carrying out my process I take coal which may be anthracite, bituminous, lignite, coke breeze, or any substance having a fuel carbon content such as ashes, and wet grind the same in a pulverizing mill until the coal has a fineness of approximately one or two hundred mesh per linear inch. The coal ground to this degree of fineness is admitted in water suspension to an elongated amalgamating vessel containing a series of agitators through which vessel the coal must pass. In this vessel I introduce the treating agent or oil, which may be a natural oil with fractions of widely different boiling points, or a blended hydrocarbon consisting of one fraction such as asphalt, and another such as kerosene. These hydrocarbon agents are thoroughly and intimately mixed with the coal in the agitating vessel and form therewith plastic amalgamated masses usually of spherical shape and substantially uniform in size. The size may be controlled, according to manipulation, from one-eighth inch to about two inches in diameter. The manipulation relates to the water dilution employed, the violency and time of agitation, and the temperature of the water and oil. A large water dilution and short time of agitation results in the making of very small masses. A small water dilution, warm water, and long agitation results in fuel spheres of the maximum size.

These masses consist of the carbonaceous particles of pulverized coal and the liquid hydrocarbon agent and from these masses, water has been eliminated as well as a large part of the impurities of the coal, these impurities having been detached from the carbon of the coal by the step of very fine pulverizing.

For the purpose of making these masses into hard fuel marbles, it is necessary to remove a substantial quantity of the hydrocarbon agent from the purified masses. For this purpose I can use as a treating agent a natural oil containing different boiling point fractions or a blended oil as set forth above.

In performing the process I take, say, two hundred grams of coal of a fineness of about two hundred mesh and while this coal is in water suspension, I treat it with eighty grams of a blended oil. Of this blended oil two-thirds thereof is kerosene and one-third, by weight, asphalt or a similar substance which is practically solid at normal atmospheric temperatures. The asphalt and kerosene together provide the necessary quantity of oil for purifying the coal by eliminating ash and water and form the plastic fuel masses. The asphalt may be melted when mixed with the kerosene and obviously the kerosene serves to keep it dissolved and in liquid condition. In lieu of kerosene a solvent such as benzol or light fuel oils may be used. Heavy fuel oils and refinery residuums may be used without introducing any solid binder on account of their containing fractions that will be substantially solid after the heat treatment of the fuel masses. I take the amalgamated masses made from the material first mentioned, which are plastic in consistency and heat said masses to a temperature of approximately 300° centigrade. The heat treatment is gradual and of about one hour's duration for fuel spheres or marbles of about one half to one inch in diameter. This heat treatment causes the kerosene fraction to vaporize, or, at least, that part of the kerosene adjacent to the surface of the marbles, leaving practically all of the volatile matter of the coal save the very light fractions near the surface of the spheres. The heat treatment thus described may distill all of the liquid of low boiling points or only that portion near the surface of each marble without disturbing the solid fraction of the agent so that when the heat treated masses cool, the solid fractions, such as the asphalt, returns to a solid state or consistency and brings the fine coal particles into hard firm marbles or masses of sufficient strength to stand the ordinary handling necessary in the transportation and moving of solid fuels and the product is itself a clean high-grade solid fuel which burns substantially smokeless.

The temperature to which the material is subjected may, of course, vary materially, depending upon the vaporizing point of the low boiling point constituent of the treating agent. For instance, should gasolene be used, the distilling temperature will approximate the end point of gasolene. That is to say, in all instances, I preferably use a distilling temperature about equal to the end point of the low hydrocarbon product content in the agent.

Each fuel mass contains a multitude of exceedingly fine coal particles containing practically all of the original volatile content except a small portion that may be distilled where the surface of the masses comes in direct contact with the heat. A slight carbonization may take place on the surfaces but it is not intended that there shall be any carbonization or, at least, not more than a very superficial skin carbonization more or less unavoidable in the application of the heat treatment.

Having thus described my invention, what I claim as new and useful is:

1. A process of producing an artificial fuel consisting of mixing with finely pulverized coal, while wet, a hydrocarbon agent containing a low boiling point fraction and a high boiling point fraction to combine with the coal particles and form a purified plastic mass and in subjecting the said mass to a low temperature heat treatment to vaporize the low boiling point fraction of the treating agent without vaporizing the high boiling point fraction and the volatiles of the coal, which high boiling fraction, upon cooling, combines with the coal particles and forms a hard fuel mass.

2. A process of producing an artificial fuel consisting in treating finely pulverized coal while wet with a blended agent consisting of a hydrocarbon solid at normal atmospheric temperature, and a lower boiling point liquid hydrocarbon oil to amalgamate the coal particles into plastic masses, excluding impurities and in subjecting each plastic mass to a heat treatment sufficient to vaporize the low boiling point oil in the treating agent without substantially disturbing the higher boiling point substances and the volatiles of the coal, said mass upon cooling of the normal solid fractions of the agent, forms a hard solid fuel body.

3. A process of preparing a purified fuel consisting in treating a finely pulverized combustible carbon while wet with a hydrocarbon agent containing low boiling point fractions and high boiling point fractions, the latter being substantially non-fluid at normal atmospheric temperatures, to combine with the coal particles upon agitation to form a purified substantially plastic mass, in subjecting said mass to a low temperature heat treatment to vaporize the low boiling point fraction of the treating agent without substantially vaporizing the high boiling point fraction and the volatiles of the coal, which mass, upon cooling, forms a solid hard fuel body.

4. As an article of manufacture, a fuel consisting of a mass of finely pulverized coal in a substantially spherical form, said mass having incorporated therein a hydrocarbon oil normally solid at atmospheric temperatures and having been subjected to a heat treatment of a low temperature to slightly fuse the surface of the mass without removing volatiles from the interior thereof.

5. A process of preparing a solid fuel consisting of treating finely pulverized coal while wet with a liquid hydrocarbon agent, which has a residuum fraction that is substantially solid at ordinary temperatures to form a plastic purified fuel mass, passing same through a machine to mold the mass into desired shape and subjecting the mass to low temperature distillation to remove moisture and that part of the light boiling fractions of the agent that are near the surfaces of the molded mass, without substantially distilling the residuum fractions, thereby resulting in a fuel with hardened surfaces.

6. A process of producing a prepared solid fuel, consisting in mixing with finely pulverized coal while wet a liquid hydrocarbon agent having fractions of different boiling points to combine with the purified coal particles, rejecting ash and water and forming a purified plastic fuel mass, in subjecting said mass to low temperature heat treatment to vaporize low boiling fractions of the agent and forming thereby a solid fuel mass containing substantially all of the volatile of the coal, in cooling and condensing the distilled oil fractions and reusing the same as the light boiling fractions of the liquid hydrocarbon agent for manufacturing additional solid purified fuel masses.

7. As an article of manufacture, a fuel consisting of comminuted carbonaceous material and a hydrocarbon oil in mass formation, the surface of said mass being hardened by the application of heat to render the same self-sustaining without substantially removing the volatiles from the interior of the mass.

8. As an article of manufacture, a fuel composed of comminuted coal and a mineral oil formed in a homogeneous mass of a determined contour, said mass having its surface partially carbonized without a substantial removal of heavy volatiles from the interior thereof, said partially carbonized surface rendering the mass self-sustaining.

9. As an article of manufacture, a fuel consisting of a mass of comminuted coal having incorporated therewith a mineral oil and formed into a body of a desired contour, said mass having been subjected to a heat treatment sufficient to fuse the surface thereof without substantially removing heavy volatiles from the interior thereof whereby said mass is rendered self-sustained.

10. A process of producing an artificial fuel consisting in mixing finely pulverized coal with a mineral oil, in forming said mixture into a mass of a desired contour and in subjecting said mass to a low temperature heat treatment sufficient to slightly carbonize the surface of the mass without substantially vaporizing the volatiles of the coal and the oil in the interior of said mass.

11. A process of producing an artificial fuel, consisting in mixing finely pulverized coal with a hydrocarbon substance, in forming said mixed coal and hydrocarbon substance into masses of a definite contour, and in subjecting said masses to a low temperature heat treatment sufficient to carbonize only the surface thereof without substantially removing the volatiles within the interior of said mass to form a self-sustaining coal and oil mass having substantially its original volatile content.

In testimony whereof I affix my signature.

WALTER EDWIN TRENT.